United States Patent

Assarsson

[15] 3,664,343

[45] May 23, 1972

[54] DISPOSABLE ARTICLES

[72] Inventor: Per Gunnar Assarsson, Montclair, N.J.

[73] Assignee: Union Carbide Corporation, New York, N.Y.

[22] Filed: Oct. 6, 1969

[21] Appl. No.: 864,193

[52] U.S. Cl..............................128/284, 128/285, 128/290, 128/296, 204/159.14, 260/2 EN, 260/9 R, 260/29.2 EP, 260/823

[51] Int. Cl..................C08g 43/02, A61f 13/16, A61f 13/18

[58] Field of Search..................260/823; 128/287, 290, 285, 128/296, 284; 204/159.14

[56] References Cited

FOREIGN PATENTS OR APPLICATIONS 1,163,842  9/1969  Great Britain..........................260/823
6,613,609  3/1967  Netherlands..........................260/823

Primary Examiner—Samuel H. Blech
Attorney—Paul A. Rose, Gerald R. O'Brien and William R. Moran

[57] ABSTRACT

Improved disposable absorbent articles, such as diapers, catamenial devices and sanitary napkins, are provided which contain certain stabilized insoluble hydrophilic poly(ethylene oxide) polymers as an absorbing media. The polymers are stabilized with a stabilizing amount of poly(ethylene imine).

14 Claims, No Drawings

DISPOSABLE ARTICLES

This invention relates, in general, to improved disposable absorbent articles. In one aspect, this invention relates to absorbent articles containing stabilized water insoluble hydrophilic poly(ethylene oxide) polymers. In a further aspect, this invention relates to disposable absorbent articles such as diapers, catamenial devices, sanitary napkins, dental rolls, surgical sponges, obstetrical napkins, incontinent pads and the like. In another aspect, this invention relates to the stabilized water insoluble hydrophilic poly(ethylene oxide) polymers.

Although disposable absorbent articles for the absorption of body fluids have been in use for many years they have not always been completely satisfactory to the user. Numerous materials, variations in construction, and absorbents have all been reported in the literature. However, many products currently on the market suffer from the disadvantage of having poor or inferior absorption properties. In the past, the usual method employed to increase absorption characteristics was to add inexpensive materials which had high absorptive capacity such as fluffed wood pulp and the like, contained between layers of moisture permeable fabrics. While satisfactory as absorbents for fluids, in many instances the article would be bulky and not comfortable. For example, diapers must have a minimum thickness to insure sufficient absorption of body fluids. If, however, the material has low absorbing ability, to be acceptable, the diaper would undoubtedly be bulky and not conform properly to body contours.

Moreover, one of the major disadvantages of the products commercially available today, is that while they may have relatively high absorptive capacities, the absorbing media, if subjected to pressure, can release a portion of the absorbed liquid. This is due to the fact that the liquid is physically entrapped within a fibrous structure and a relative slight pressure is all that is needed to cause the liquid to separate from the absorbent media. This, of course, is highly undesirable, particularly in catamenial devices.

In U.S. Pat. No. 2,849,000 there is disclosed an improved catemenial device wherein the absorbent cotton fibers are coated with a retention agent to increase absorbency Typical retention agents set forth are sorbitol, mannitol, glycerine, glycols and glycol polymers. These compositions are applied by spraying onto the cotton or by including in the final washing step when the absorbent cotton bats are manufactured. However, the compositions disclosed while possessing absorbent characteristics are soluble and hence can be extracted from the cotton fibers by body fluids.

More recently, it has been found that insoluble hydrophilic poly(ethylene oxide) polymers are particularly useful in disposable absorbent articles since they can absorb relatively large amounts of liquids and retain them even when subjected to pressure. Although these polymers are relatively stable over extended periods of time in the presence of oxygen at temperatures up to about 25° C., at elevated temperatures, such as at about 40° C., the polymers degrade in the presence of small amounts of oxygen. For instance, after less than about 6 weeks of storage at 40° C. in water containing only dissolved oxygen, the unstabilized polymer becomes 100 percent water-soluble. (The water-solubility of the polymer, which is initially insoluble, is one useful indication of the degree of degradation.)

The water-soluble poly(ethylene oxide) polymers, which are used as precursors in the preparation of the water-insoluble hydrophilic poly(ethyelene oxide) polymers, also suffer from oxidative degradation. Many stabilizers have been proposed for the soluble polymer. Despite the structural relationship between the soluble polymers and the subject insoluble polymers, no necessary correlation has been found between the ability of a material to stabilize the soluble polymer and the ability of that same material to stabilize the insoluble polymer. As an illustration, certain alcohols, such as isopropyl alcoholand proplyene glycol can be used to stabilize the soluble polymer. However, the alcohols have been found to be very inefficient, if not completely ineffective in stabilizing the insoluble polymer.

It is therefore an object of this invention to provide disposable absorbent articles wherein many of the previous disadvantages are eliminated or greatly reduced. It is a further object of this invention to provide an improved disposable absorbent article containing a stabilized insoluble hydrophilic poly(ethylene oxide) polymer as an absorbing media. Another object of this invention is to provide a disposable absorbent article having improved absorption properties. A further object is to provide an absorbent article containing a stabilized insoluble hydrophilic polymer comprised of cross-linked poly(alkylene oxide). A still further object is to provide an absorbent article containing stabilized cross-linked poly(ethylene oxide). Another object is to provide stabilized cross-linked poly(ethylene oxide). Another object of this invention is to provide an improved disposable absorbent article wherein the polymer is essentially insoluble in body fluids. These and other object will readily become apparent to those skilled in the art in the light of the teachings herein set forth.

In its broad aspect, the present invention is directed to improved disposable absorbent articles. The improvement comprises incorporating in the article a water-insoluble hydrophilic poly(ethylene oxide) polymer which has been stabilized with poly(ethylene imine).

Poly(ethylene oxide) polymers which have been insoluble by cross-linking are particularly useful because of their ability to incorporate very large amounts of liquid, e.g., water, in the order of 25 to 100 times their dry weight. Moreover, these polymers, in addition to possessing the ability to incorporate large amounts of water, are insoluble in water irrespective of temperature, will retain liquids, solutions and suspensions and will form gel-like products.

The non-stabilized water-insoluble hydrophilic poly(ethylene oxide) polymers are known compositions. For instance, the nature and preparation of these insoluble polymers is disclosed in U.S. Pat. No. 3,264,202, issued Aug. 2, 1966, to Paul A. King, the disclosure of which is incorporated herein by reference. The insoluble polymers are prepared by subjecting water-soluble poly(ethylene oxide) polymers to ionizing radiation in a dose sufficient to cross-link the polymer to form thereby a water-insoluble polymer. The water-soluble poly(ethylene oxide) polymers that are used to produce the water-insoluble polymers are also well known compositions. For instance, their nature and preparation are disclosed in U.S. Pat. Nos. 3,127,371; 3,214,387; 3,275,998; 3,398,199; and, 3,399,149.

The water-soluble poly(ethylene oxide) polymers are homopolymers of ethylene oxide and copolymers of ethylene oxide with one or more other alkylene oxides, such as propylene oxide, 1,2-butylene oxide, 2,3-butylene oxide, isobutylene oxide, styrene oxide, and the like. The polymer contains polymerized ethylene oxide in an amount sufficient to impart water-solubility to the polymer. Thus the minimum proportion of polymerized ethylene oxide in the polymer will vary somewhat, depending upon the nature of the comonomer(s), but in general will be at least about 50 weight percent of ethylene oxide, and is preferably at least about 75 weight percent of polymerized ethylene oxide. Ethylene oxide homopolymer is the preferred poly(ethylene oxide) polymer.

The water-soluble poly(ethylene oxide) polymers will usually have molecular weights such that the reduced viscosity of the polymer will be within the range of from about 0.5 to about 75, and higher, and preferably from about 1 to about 60, or an aqueous viscosity at 25° C. of from about 225 centipoises measured at a 5 weight percent concentration, to about 12,000 centipoises, and higher measured at a 1 weight percent concentration.

The reduced viscosity is measured by the following method. Transfer 100 ml of acetonitrile to an 8 oz., round screw-cap bottle. With constant stirring, introduce into the bottle 0.200 gram of the polymer weighed to the nearest milligram. Line the screw cap of the bottle with a piece of aluminum foil, carefully place the cap on the bottle, and tighten securely. Place the bottle on a suitable can roller with 6-inch (I.D.) roller and allow it to roll for 16±0.5 hours. Remove the bottle from the roller and filter the solution by pressure through a coarse sintered glass filter. Determine the time in seconds required for the sample solution to pass through a calibrated Ubbelohde suspended-level viscometer at 30±.01° C. Use a suitable stopwatch with a 10-second dial graduated in 0.1 second units, accurate to within 0.1 percent when tested over a 60-minute period. Record the time required. Determine and record the time in seconds required for the acetonitrile to pass through the viscometer.

Calculation:
$AS - (E/AS) = AC$
$SS - (F/SS) = SC$
$(SC-AC)/AC = SV$
$SV/K = RV$
$F$ = viscometer correction
$AS$ = seconds, required for acetonitrile
$AC$ = seconds, corrected, required for the acetonitrile
$SS$ = seconds, required for the polymer solution
$SC$ = seconds, corrected, required for solution
$SV$ = specific viscosity
$RV$ = reduced viscosity
$K$ = concentration, gm sample per 100 ml acetonitrile For illustrative purposes, the following table illustrates the relation between the average molecular weight of poly(ethylene oxide) homopolymer, reduced viscosity and bulk viscosity of solutions thereof.

| wt.% polymer in acetonitrile | reduced viscosity | approx. avg. mol. wt. | bulk viscosity aqueous soln. at 25° C. |
|---|---|---|---|
| 0.2 | 1.5 | 150,000 | 200 cps (5wt.% Soln) |
| 0.2 | 60 | 10,000,000 | 7000-9000 cps (1wt. % Soln) |

The terms "aqueous viscosity" or "bulk viscosity" as employed herein refer to the viscosity of a solution of the stated concentration of polymer in water, as measured on a Model RVF Brookfield Viscometer using a No. 1 spindle operated at 2 revolutions per minute. The viscosity is measured at ambient room temperatures, that is, at about 24° C.

The water-insoluble hydrophilic poly(ethylene oxide) polymers are produced by subjecting the above-described water-soluble poly(ethylene oxide) polymers to sufficient ionizing radiation to cross-link and insolubilize the polymer, forming thereby a water-insoluble hydrophilic polymer. As used herein, the term "ionizing radiation" includes that radiation which has sufficient energy to cause electronic excitation and/or ionization in the polymer molecules (where a solvent is employed) but which does not have sufficient energy to affect the nuclei of the constituent atoms. Convenient sources of suitable ionizing radiation are gamma ray-producing radioactive isotopes such as $Co^{60}$ and $Cs^{137}$, spent nuclear fuel elements, X-rays such as those produced by conventional X-ray machines, and electrons produced by such means as Van de Graaff accelerators, linear electron accelerators, resonance transformers, and the like. Suitable ionizing radiation for use in the present invention will generally have an energy level in the range from about 0.05 MeV to about 20 MeV.

The irradiation of the non-crosslinked (water soluble) polymers can be carried out in the solid phase or in solution. Solid polymers can be irradiated in the air, in a vacuum, or under various gaseous atmospheres, while irradiation in solution can be carried with the polymer dissolved in water, or in mixtures of water and water-miscible organic solvents. Any conventional method can be used to bring the solid polymer or polymer solution into contact with the ionizing radiation. Suitable methods are well known and understood by those skilled in the art.

The exact amount of ionizing radiation to which the polymer must be subjected depends on a number of variables. In general, when irradiation is carried out at relatively low rates and in the presence of free radical scavengers such as oxygen, extremely high total doses are required to produce the water-insoluble hydrophilic polymers. On the other hand, when the irradiation is carried out under conditions which favor the relatively long existence of the free radicals produced, for example, when the irradiation is carried out with a high dose rate, in the absence of oxygen, or in solution where oxygen is rapidly used up, the formation of water-insoluble hydrophilic polymers take place readily. The preferred method for producing the water-insoluble hydrophilic polymers is to carry out the irradiation in an aqueous solution of the water-soluble polymer while employing ionizing radiation having an energy level in the range of about 0.10 MeV. to about 20 MeV. at a total dose of between about 0.05 and 10 megarads.

Thus, the polymeric hydrophilic gels are comprised of polymers of the formula:

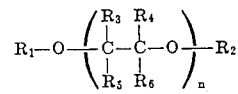

which have been cross-linked and wherein $R_1$ and $R_2$ are selected from the group consisting of hydrogen, alkyl radicals and alkyl-substituted aryl radicals, and wherein $R_3$–$R_6$ are selected from the group consisting of hydrogen, methyl, phenyl and vinyl radicals and $n$ is greater than 1.

These hydrophilic gels contain at least one of the structural units shown below:

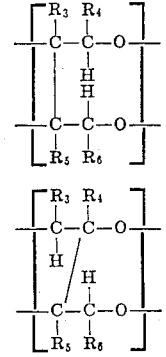

wherein $R_3$–$R_6$ are as indicated above.

The terms "insoluble" or "insolubilize" as employed throughout the specification are utilized herein to refer to the formation of a polymer, a variable portion of which is essentially insoluble in water, depending upon the radiation dose. These polymers can swell and absorb may times their weight in water because they are also hydrophilic.

As previously indicated, the articles of this invention contain water-insoluble, hydrophilic poly(ethylene oxide) which has been stabilized with poly(ethylene imine) the poly(ethylene imines) are those polymers prepared from ethylene imine and which in a major amount contain the recurring units:

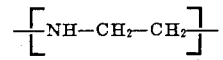

and in a minor amount the recurring unit:

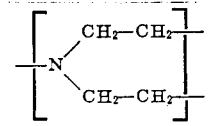

In practice poly(ethylene imine) polymers having molecular weights of from about 10,000 to about 100,000 are ideally suited for use in the instant invention. Particularly preferred are the poly(ethylene imine) polymers having molecular weight of from about 20,000 to about 80,000. These polymers are prepared by processes known in the literature and are commercially available.

In practice, the poly(ethylene imine) stabilizer is employed in a stabilizing amount. By the term "stabilizing amount" as employed throught the specification and claims, is meant that quantity of poly(ethylene imine) which when admixed with the poly(ethylene oxide) will decrease the rate of degradation over that of the unstabilized polymer. It has been observed that as little as about 0.01 weight percent based on the solid poly(ethylene oxide) polymer, will effectively stabilize the polymer against degradation. For most purposes a concentration of stabilizer in the range of from about 0.2 to about 3.0 weight percent is preferred. However, if desired, concentrations of poly(ethylene imine) as high as 50 weight percent can be employed.

The stabilization of the water insoluble, hydrophilic poly(ethylene oxide) can be effected at various stages in its preparation. For example, the poly(ethylene imine) can be added to an aqueous solution of the poly(ethylene oxide) and the resulting solution cast into a film and subsequently cross-linked. The addition of the stabilizer to the poly)ethylene oxide) solution also imparts a stabilization effect to the solution itself. Alternatively, the pure solid polymer can be mixed with the stabilizer and the resulting product extruded or calendered into a film or other shaped object. The resulting film or object is then cross-linked by irradiation. The addition of the stabilizer before extrusion or calendering, imparts a stabilizing effect while the polymer is melt blended at elevated temperatures. Finally, the water insoluble, hydrophilic poly(ethylene oxide) can be stabilized after the irradiation step by absorption of the stabilizer from solution.

The stabilized hydrophilic poly(ethylene oxide) polymers can be readily incorporated into any of the known or commercially available disposable articles where they are particularly useful for increasing absorbancy. For example, the polymers can be incorporated into diapers of the type disclosed in U.S. Pat. Nos. 2,788,003; 2,849,000; 2,860,637; 3,306,293; and 2,667,168. Similarly, they can be incorporated into tampons or sanitary napkins of the type disclosed in U.S. Pat. Nos. 3,121,427; 3.070,095 and the like. The polymers can be employed in a wide variety of ways, such as, for example, as a powder dispersed in and bonded to a cellulosic or similar substrate, or as a film of the cross-linked polymer sandwiched between layers of the supporting structure. Any of several known methods can be employed to affix the film or powdered polymer to the substrate.

In general, the amount of hydrophilic gel employed will be dependent upon the particular absorbent article and its intended use. In practice, it has been observed that disposable absorbent articles can be prepared containing from about 2 to about 98 weight percent.

The examples below illustrate the efficacy of the stabilizer of the invention in enhancing the stability of insoluble, hydrophilic poly(ethylene oxide) polymers.

In Examples 1-3, the insoluble hydrophilic poly (ethylene oxide) polymer was prepared by subjecting an aqueous solution containing 4 weight percent coagulant grade poly(ethylene oxide) homopolymer having a reduced viscosity of about 60 to ionizing radiation having an energy level of 1 million electron volts to a total dose of about 1 megarad. The ionizing radiation was produced by a Van de Graaff accelerator.

The polymer was produced in the form of a 3-inch wide tape weighing 1 gram per linear foot, which had a thin open structured gauze support. The tapes were not dried and were subjected to the following standard procedure for evaluation in the gel form.

Two pieces of the above-described tape, each 1 foot long, were placed in a jar containing the below-indicated concentration of stabilizer in aqueous solution. The solution was prepared by dissolving an appropriate amount of poly(ethylene imine) in 500 milliliters of distilled water. The jar was loosely covered and then placed in an air oven held at 40° C. A periodic check of the polymer integrity was made by feeling the firmness of the tape. Also, the pH of the solution plus the polymer was measured periodically, since degradation is usually accompanied by a lowering of the pH. The ratings of the tape appearance were as follows:

(+) tape firm, no noticeable degradation
(±) tape cohesive, noticeable degradation due to softness or stringy surface.
(−) tape 100 percent destroyed (i.e., 100 percent soluble in water)

The stabilizers used, their concentrations, and the results of the evaluations are set forth in the following examples.

EXAMPLE 1

In this example a tape was prepared in accordance with the foregoing procedure but without the poly(ethylene imine) stabilizer and served as a control for comparison purposes. When subjected to the above standard procedure the following results were obtained.

TABLE 1

| Interval | Tape Appearance | pH |
|---|---|---|
| ¾ month | (−) | 3.5 |

EXAMPLE 2

In this example, a poly(ethylene imine) solution was prepared by dissolving 0.215 gram of poly(ethylene imine) (approximately 50,000 molecular weight) in 500 milliliters of water to yield a $10^{-3}$ molar solution of poly(ethylene imine) monomer units. In this solution were placed the tapes in accordance with the standard procedure. The following results were obtained.

| Interval | Tape Appearance | pH |
|---|---|---|
| ¾ month | (+) | 9.4 |
| 1¾ months | (+) | 8.9 |
| 3¾ months | (+) | 8.4 |
| 6 months | (+) | 8.8 |

EXAMPLE 3

A poly(ethylene imine) solution was prepared by dissolving 0.0002 gram of poly(ethylene imine) (approximately 50,000 molecular weight) in 500 milliliters of water to yield $10^{-5}$ molar. In this solution were placed the tapes in accordance with the standard procedure. The following results were obtained.

TABLE 3

| Interval | Tape Appearance | pH |
|---|---|---|
| ¾ month | (+) | 7.4 |
| 1¾ months | (+) | 7.4 |
| 3¾ months | (+) | 7.3 |
| 6 months | (+) | 8.4 |

EXAMPLE 4

This example illustrates the stabilization of the hydrophilic poly(ethylene oxide) by addition of the stabilizer to the aqueous poly(ethylene oxide) solution prior to cross-linking. The poly(ethylene imine) has a stabilizing effect on the poly (ethylene oxide) solution prior to as well as after cross-linking.

Three aqueous solution mixtures were made up containing the following proportions; (A) 4 weight percent of poly(ethylene oxide) homopolymer (having a reduced viscosity of about 60) and 0.13 weight percent poly(ethylene imine) homopolymer (having a molecular weight of about 50,000) yielding a solution with a monomer mole ratio of 30:1 respectively, (B) 4 weight percent of poly(ethylene oxide) homopolymer (as above) and 0.04 weight percent poly(ethylene imine) homopolymer (as above) yielding a solution with a monomer mole ratio of 100:1 respectively, (C) 4 weight percent of poly(ethylene oxide) homopolymer (as above) and 0.027 weight percent poly(ethylene imine) homopolymer (as above) yielding a solution with a monomer mole ratio of 150:1.

These solutions were cross-linked with ionized radiation having an energy level of one million electron volts to a total dose of about one megarad. The ionized radiation was produced by a Van de Graaff accelerator. The polymer gels produced by this process were a 3-inch wide tape weighing about 15 grams per linear foot. The tape had an open structured gauze support. The tape was dried into a film by exposure to air at room temperature for a period of about 16 hours (overnight). In the control experiments wherein no poly(ethylene imine) was added, the tape was produced and dried in a similar manner.

This example demonstrates the efficacy of the added poly(ethylene imine) in three different proportions to stabilize the dried hydrophilic insoluble poly(ethylene oxide).

One-half foot samples of both stabilized and unstabilized tape were wrapped into a 7.5 inch × 3 inch cotton strip, taped together as a roll, and then placed into an air oven held at 90° C. After varying lengths of time, the rolls were taken out of the oven, the tape recovered and placed in 500 milliliters of 10 weight percent water in methanol to extract the degraded soluble polymer. Table IV below depicts the weight of the tape (excluding the gauze) immediately after drying, the weights of the tape after exposure to the 90° C. air oven for varying lengths of time followed by extraction, and the weight percent of polymer that was degraded after such exposure.

TABLE IV

| Sample | Length of Time in Oven-Hours | Weight-Grams Before Oven | Weight-Grams After Oven | Percent Degraded |
|---|---|---|---|---|
| Poly(ethylene oxide) Film Not Stabilized | | | | |
| No. 1 | 1 | 0.7735 | 0.7064 | 17.9 |
| 2 | 1.5 | 0.9574 | 0.7702 | 32.7 |
| 3 | 2.5 | 0.8919 | 0.6678 | 46.1 |
| 4 | 3 | 0.9448 | 0.6037 | 63.6 |
| 5 | 4 | 0.6891 | 0 | 100 |
| Poly(ethylene oxide) Film Stabilized; Solution (A) 30:1 | | | | |
| 6 | 1.5 | 0.6540 | 0.6195 | 5.3 |
| 7 | 4 | 0.6815 | 0.5610 | 17.7 |
| 8 | 5 | 0.4976 | 0.4174 | 16.1 |
| 9 | 8.5 | 0.7428 | 0.6505 | 12.4 |
| 10 | 23.5 | 0.7195 | 0.5441 | 23.4 |
| Poly(ethylene oxide) Film Stabilized, Solution (B), 100:1 | | | | |
| 11 | 3 | 0.7380 | 0.7321 | 0.8 |
| 12 | 6 | 0.6890 | 0.5780 | 16.8 |
| 13 | 25 | 0.6855 | 0.4526 | 23.8 |
| Poly(ethylene oxide) Film Stabilized, Solution (C), 150:1 | | | | |
| 14 | 3 | 0.5228 | 0.5184 | 0.8 |
| 15 | 6 | 0.5346 | 0.3587 | 32.9 |
| 16 | 25 | 0.4480 | 0.1047 | 76.6 |

As hereinbefore indicated the poly(ethylene imine) has a stabilizing effect on the poly(ethylene oxide) solution prior to cross-linking. This was demonstrated by preparing a 2 percent solution of poly(ethylene oxide) containing 2.5 weight percent based on the weight of solid poly(ethylene oxide). This solution and a control 12 percent poly(ethylene oxide) without the stabilizer were maintained at 40° C. for the periods indicated. The change in viscosity as measured in units of centerpoises in a Brookfield Spindle viscometer, are set forth in Table V below. The decrease in viscosity is an indication of molecular weight degradation.

TABLE V.—VISCOSITY IN CENTIPOISE OF POLY(ETHYLENE OXIDE) SOLUTIONS

| Sample | Time in days | | | | | |
|---|---|---|---|---|---|---|
| | 1 | 2 | 5 | 22 | 78 | 106 |
| Control | 54,000 | 40,000 | 50 | | | |
| Stabilized solutions | 56,000 | 52,000 | 57,000 | 61,000 | 40,000 | 28,000 |

EXAMPLE 5

Another method for preparing hydrophilic poly(ethylene oxide) films for use in the disposable articles of this invention, is to melt blend, extrude or calender solid poly(ethylene oxide). Thereafter, the resulting film is cross-linked by irradication. However, degradation is known to occur during the melt blending and shearing step when the polymer is at elevated temperatures. This example illustrates the stabilizing effect when poly(ethylene imine) is admixed with the solid poly(ethylene oxide) prior to blending.

Brabender curves were obtained on solid poly(ethylene oxide) having a molecular weight of about 600,000, using a one half size No. 6 roller hind with a jacket temperature of 150° C. The charge size selected was 26 grams.

The procedure consisted of charging the mixer head at 40 rpm through the quick load chute and with the read out instrument on the 5X scale. Three minutes later the scale was set at 1X with a 500 m-gm. preloading. At the same time, the speed was increased to 100 rpm and the curve was plotted until the torque level decayed to 75 percent of its original level. The time to reach this point was then taken as a measure of the stabilizing efficiency of the stabilizer. This time was measured from the point where the speed was increased to 100 rpm; the original torque level was also taken at this point. These results are summarized below in Table VI.

TABLE VI

| Sample No. | Percent Stabilizer | Original Torque To. m-gm. | Time 75% of To. Min. |
|---|---|---|---|
| 1 | 0 | 1280 | 4.5 |
| 2 | 1.6 | 1380 | 23.0 |
| 3 | 0.25 | 1380 | 8.5 |
| 4 | 0.12 | 1380 | 7.5 |

The "rate of torque decay" was also calculated by using the instananeous slope to the curve at the point where 75 percent of the original torque was achieved. These results are shown in Table VII.

TABLE VII

| Sample No. | Percent Stabilizer | Rate of Torque Decay m-gm./min. |
|---|---|---|
| 1 | 0 | 88.9 |
| 2 | 1.6 | 9.1 |
| 3 | 0.25 | 44.5 |
| 4 | 0.12 | 48.8 |

These data show that 0.25 percent added poly(ethylene imine) has slowed the rate of decay to one-half that of unstabilized poly(ethylene oxide).

In sample 1, the melt temperature increased to a maximum of 169° C. at about 7.5 minutes (measured from the start of the experiment) and then decayed very rapidly as degradation occurred until at 15–16 minutes it had equilibrated to the bowl temperature. Sample 2 reached a maximum of 175° C. at about 14 minutes and then decreased by only 1° C. over the next 14 minutes of processing. Sample 3 reached a maximum of 174° C. at about 9 minutes and then started to drop very gradually. Sample 4 behaved very much like sample 3.

EXAMPLE 6

A set of tampons were made on an in-line production machine by feeding a 1-yard long and 3-inch wide composite strip made by alternately layering two pieces of dried polymer, prepared as in Example 4, with a thin gauze support made from solution cocross-linking poly(ethylene oxide) with poly(ethylene imine) at a monomer ratio of 30:1 respectively and the polymer weighing 4.7 g/yd between three pieces of cotton weighing 12g/yd herein called 2-ply tampons. In a similar manner tampons with only one piece of the polymer and layered between three pieces of same cotton produced as samples herein called 1-ply tampons. Control tampons were made by layering four pieces of same cotton weighing 12 g/yd.

The absorption efficiency of these differently constructed tampons were tested in three different apparatus using as absorbing fluid water, physiological saline water, and citrated blood.

1. Apparatus I was constructed by filling a 3-inch diameter plastic bottle about 5 inches deep with a 10 percent poly(ethylene solution), coagulant grade, with a 10 mm glass rod 4 ½ inches long imbeded in the center and irradiating the bottle and contents in a cobalt 60 source to a total dose of about 1 megarad. The resulting gel with container and with the rod removed was tilted at a 40° angle with the mouth of the hole downward and connected to a 50 cc burette via a plastic tube going through the backside of the gel to the center hole. Test tampons were inserted completely through the mouth of the hole and the fluid, in this case water, from the burette allowed to flow into the hole at a controlled rate of about 10–20 cc/hr. As the tampon became saturated at the particular pressure in the test apparatus the break-through fluid was collected and measured, while the tampon was weighed prior to the test and saturated at the end of the test. Apparatus II was constructed by filling a 3-inch diameter plastic bottle about 5 inches deep with a 10 percent poly(ethylene solution), coagulant grade, with a 7 mm glass rod 4 ½ inches long imbeded in the center and irradiating the bottle and contents in a cobalt 60 source to a total dose of about 1 megarad. The resulting gel with container and with the rod removed was tilted at a 40° angle with the mouth of the hole downward and connected to a 50 cc burette via a plastic tube going through the backside of the gel to the center hole. Test tampons were inserted completely through the mouth of the hole and the fluid in this case, physiological saline water, from the burette allowed to flow into the hole at a controlled rate of about 10–22 cc/hr. As the tampon became saturated at the particular pressure in the test apparatus the break-through fluid was collected and measured, while the tampon was weighed prior to the test and saturated at the end of the test.

The absorption capacity results obtained on the test tampons with 1-ply (hydrogel with gauze), 2-ply (hydrogel with gauze), and control tampons are shown in Table VIII below.

TABLE VIII

Absorption Studies of Tampons With Stabilized Hydrophilic Poly(ethylene oxide)[1]

| Sample | Water Uptake | Dry Wt Tampon | Capacity grams liquid per g. tampon | Percent increase over control |
|---|---|---|---|---|
| Control Reg. Tampon | 11.6 g | 3.0 g | 3.90 | — |
| 1 Ply Film w/gauze | 13.3 g | 3.1 g | 4.30 | 10.3 |
| 2 Ply Film w/gauze | 17.1 g | 3.3 g | 5.20 | 33.3 |

[1] In vitro conditions at 0.5 pounds per square inch pressure. Monomer mole ratio of 30:1.

The absorption capacity results obtained on the test tampons with 2-ply film (hydrogel without gauze), 2-ply scrim (hydrogel with gauze) and control tampons are shown in Table IX below.

TABLE IX.—ABSORPTION STUDIES OF TAMPONS WITH STABILIZED HYDROPHILIC POLY (ETHYLENE OXIDE)[1]

| Sample | Citrated blood | Saline water uptake, g. | Dry wgt. tampon, g. | Capacity, grams liquid per gram tampon | Percent increase over control |
|---|---|---|---|---|---|
| Control reg. tampon | | 10.25 | 3.0 | 3.42 | |
| 2-ply film w/gauze | | 14.3 | 3.25 | 4.40 | 29.4 |
| 2-ply film w/o gauze | | 16.3 | 3.25 | 5.02 | 47.0 |
| 2-ply film w/gauze | 16.2 | | 3.3 | 4.91 | 44 |

[1] In vitro conditions at about 1.0 pound per square inch pressure. Monomer mole ratio of 30:1.

EXAMPLE 7

In addition to tampons, the hydrogels of this invention are also useful in sanitary napkins. A test model was prepared in the following manner.

A 10 percent high molecular weight poly(ethylene oxide) solution was poured into a round open end polyethylene mold 2 ½ inches in diameter and 5 inches long into which was inserted in the center a glass tube ⅜ inch in diameter to a depth of about ½ inch from the back side of the mold. This assembly was irradiated in a Cobalt 60 source to a total dose of about 1 megarad to produce a cohesive but flexible gel. With the glass tube removed and a burette attached through the back of the model to the center hole, a controlled rate of test fluid (water or saline water) was delivered through the hole. The model was inclined at about a 45° angle using a clamp around the model and with the mouth of the hole downward and the model dressed with a sanitary napkin. Commercial napkins sold under the trade name "Kotex" were sandwiched with two layers of the poly(ethylene oxide)-poly(ethylene imine) film prepared in accordance with Example 4 (A). The napkins were placed on the model using a slow rate of water delivery, about 1 cc per minute. A significant improvement on the absorption capacity of the commercially available napkins with the cross-linked polymer is noted over control napkins.

Although the invention has been illustrated by the preceding examples, it is not to be construed as being limited to the materials employed therein, but rather, the invention encompasses the generic area as hereinbefore disclosed. Various modifications and embodiments of this invention can be made without departing from the spirit and scope thereof.

What is claimed is:

1. In a disposable absorbent article, the improvement which comprises incorporating in said article at least one hydrophilic polymer of the formula:

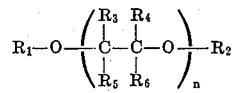

which has been cross-linked, wherein $R_1$ and $R_2$ are selected from the group consisting of hydrogen, alkyl radicals and alkyl substituted aryl radicals, and wherein $R_3$–$R_6$ are selected from the group consisting of hydrogen, methyl, phenyl and vinyl radicals, and $n$ is greater than 1, said polymer having incorporated therein at least a stabilizing amount of poly(ethylene imine).

2. The disposable absorbent article of claim 1 wherein said hydrophilic polymer is comprised of cross-linked poly(alkylene oxide).

3. The disposable absorbent article of claim 1 wherein said hydrophilic polymer is comprised of cross-linked poly(ethylene oxide).

4. A catamenial device containing the stabilized hydrophilic polymer as defined in claim 1.

5. The catamenial device of claim 4 wherein said polymer is cross-linked poly(ethylene oxide).

6. A sanitary napkin containing the stabilized hydrophilic polymer as defined in claim 1.

7. The sanitary napkin of claim 6 wherein said polymer is cross-linked poly(ethylene oxide).

8. A tampon containing the stabilized hydrophilic polymer as defined in claim 1.

9. The tampon of claim 8 wherein said polymer is cross-linked poly(ethylene oxide).

10. A diaper containing the stabilized hydrophilic polymer as defined in claim 1.

11. The diaper of claim 10 wherein said polymer is cross-linked poly(ethylene oxide).

12. Process for stabilizing water-insoluble hydrophilic poly(ethylene oxide) polymer which comprises incorporating in said polymer at least a stabilizing amount of poly(ethylene imine).

13. The stabilized polymer of claim 12.

14. Process for stabilizing water insoluble hydrophilic poly(ethylene oxide) which comprises incorporating in water soluble poly(ethylene oxide) polymer at least a stabilizing amount of poly(ethylene imine) and thereafter cross-linking said polymer by exposure to ionizing radiation.

* * * * *